United States Patent
Burrowes et al.

(10) Patent No.: US 9,637,312 B2
(45) Date of Patent: May 2, 2017

(54) CONVEYOR BELT

(71) Applicants: Thomas George Burrowes, N. Canton, OH (US); Mayu Si, Hudson, OH (US)

(72) Inventors: Thomas George Burrowes, N. Canton, OH (US); Mayu Si, Hudson, OH (US)

(73) Assignee: Veyance Technologies, Inc., Fairlawn, OH (US)

(*) Notice: Subject to any disclaimer, the term of this patent is extended or adjusted under 35 U.S.C. 154(b) by 0 days.

(21) Appl. No.: 14/446,716

(22) Filed: Jul. 30, 2014

(65) Prior Publication Data

US 2015/0034458 A1    Feb. 5, 2015

Related U.S. Application Data

(60) Provisional application No. 61/861,472, filed on Aug. 2, 2013.

(51) Int. Cl.
*B65G 15/34*    (2006.01)
*B65G 15/36*    (2006.01)

(52) U.S. Cl.
CPC ..................... *B65G 15/36* (2013.01)

(58) Field of Classification Search
CPC ........................................................ B65G 15/36
USPC ........................................................... 198/847
See application file for complete search history.

(56) References Cited

U.S. PATENT DOCUMENTS

| | | | |
|---|---|---|---|
| 3,525,703 A | 8/1970 | Iwami et al. | 523/408 |
| 4,518,376 A * | 5/1985 | Mashimo | B29D 29/10 |
| | | | 474/260 |
| 4,674,622 A * | 6/1987 | Utsunomiya | B32B 25/10 |
| | | | 198/500 |
| 6,443,866 B1 * | 9/2002 | Billups | F16G 1/28 |
| | | | 474/260 |
| 6,464,607 B1 * | 10/2002 | Rosenboom | C08L 23/16 |
| | | | 474/263 |
| 6,769,746 B2 * | 8/2004 | Rodgers | B62D 55/244 |
| | | | 305/165 |

(Continued)

FOREIGN PATENT DOCUMENTS

| | | |
|---|---|---|
| WO | DE 1248543 B | 8/1967 |
| WO | GB 1189794 A | 4/1970 |

(Continued)

*Primary Examiner* — William R Harp
(74) *Attorney, Agent, or Firm* — Alvin T. Rockhill

(57) ABSTRACT

This invention reveals a conveyor belt which is comprised of a carry cover layer, a tie gum layer which is situated immediately below the carry cover layer, a reinforcement layer which includes steel cords which are embedded in polychloroprene and which is situated immediately below the tie gum layer, and a rubber layer which is situated immediately below the reinforcement layer, wherein the carry cover layer is comprised of a millable urethane rubber. The tie gum layer will typically be an alloy of polyvinylchloride and nitrile rubber to attain good adhesion between the carry cover layer and the reinforcement layer. The subject invention also reveals a conveyor belt which is comprised of a carry cover layer, a reinforcement layer which includes a resorcinol-formaldehyde-latex coated fabric reinforcement, and a rubber layer which is situated immediately below the reinforcement layer, wherein the carry cover layer is comprised of a millable urethane rubber.

19 Claims, 1 Drawing Sheet

(56) References Cited

U.S. PATENT DOCUMENTS

| | | | |
|---|---|---|---|
| 8,007,917 B2* | 8/2011 | Alexander | B32B 25/14 198/844.1 |
| 8,142,316 B2* | 3/2012 | Goettsch | F16G 1/28 474/205 |
| 2011/0126964 A1 | 6/2011 | Burrowes et al. | 156/137 |
| 2012/0165145 A1 | 6/2012 | Kitano et al. | 474/264 |

FOREIGN PATENT DOCUMENTS

| | | |
|---|---|---|
| WO | GB 2138744 A | 10/1984 |
| WO | WO 2006/076670 | 7/2006 |

* cited by examiner

CONVEYOR BELT

This application claims the benefit of U.S. Provisional Patent Application Ser. No. 61/861,472, filed on Aug. 2, 2013. The teachings of U.S. Provisional Patent Application Ser. No. 61/861,472 are incorporated herein by reference in their entirety.

FIELD OF THE INVENTION

The invention relates to conveyor belts that are highly abrasion resistant and which are particularly useful in mining of minerals and coal by virtue of their excellent resistance to abrasion.

BACKGROUND OF THE INVENTION

In a multitude of commercial applications, it is common to employ a heavy-duty conveyor belt for the purpose of transporting product and material. The conveyor belts so employed may be relatively long, for example, on the order of miles, and represent a high cost component of an industrial material handling operation. For instance, conveyor belts are widely used for moving minerals, coal, and a wide variety of manufactured products from one point to another. Heavy duty conveyor belts used in mining operations can extend over distances of many miles and represent a high cost component of an industrial material handling operation. For instance, such conveyor belts are often used to transport minerals below the ground in mines as well as above the ground in typical mining applications.

Conventional conveyor belts which are used in heavy duty applications are typically comprised of a cured rubber as a top layer, a cured rubber as a bottom layer, and a fabric reinforcement layer (a carcass) which is sandwiched between the top layer and the bottom layer. Conveyor belts used in mining operations can be as large as ten feet wide and up to about three inches thick. The prominent material used in such conveyor belts generally is a moderately flexible elastomeric or rubber-like material, and the belt is typically reinforced by a plurality of longitudinally extending fabric reinforcements or metal cables or cords which are positioned within the belt and extend along the length thereof.

All conveyor belts are, of course, susceptible to normal wear and tear as well as damage from the material being transported and/or harsh environmental conditions. Unfortunately, conveyor belts which are used in mining operations are particularly susceptible to damage from the material transported thereon and a rip, slit, cut or tear may develop on the surface of the belt which comes in contact with the material being transported (the carry cover surface of the belt). For instance, sharp edges of the material being transported, such as iron ore and copper ore which are particularly abrasive, can gouge the surface of the belt and that can result in a rip developing and propagating deeper into the body of the belt. Such damage can ultimately result in belt failure. In the event the conveyor belt suffers catastrophic damage or otherwise becomes inoperable, the costs of repairing the conveyor belt, cleaning up the spilt material, and related downtime can be substantial. In any case, a long service life without the need for continual maintenance and damage repair is highly desirable from the standpoint of cost reduction and efficient utilization of personal and equipment.

Over the years, some improvements have been made in the wear resistance of the rubber cover materials used in manufacturing conveyor belts for transporting highly abrasive materials that quickly wear away conventional rubber conveyor belt covers. However, these improvements were only incremental by virtue of being based upon blends of standard general purpose elastomers, such as styrene-butadiene rubber (SBR), natural rubber, and polybutadiene rubber. In spite of these developments, there remains a long felt need in the mining industry for a premium belt with significantly improved abrasive wear characteristics in order to prolong belt life, reduce mine down-time, and improve productivity. Accordingly, an elastomer having higher wear resistance while maintaining all other required performance characteristics for the carry cover layer of the conveyor belt is required to make the improvement being sought in conveyor belts that are used in commercial mining endeavors. It is also important for such an elastomeric material to be capable of being compounded in the manner of a standard rubbery elastomer and to be processable on conventional rubber processing equipment thereby avoiding major capital expenditures as well of health, safety, and environmental issues. It is also critical for such an abrasion resistant material used in making the cover carry layer to exhibit good adhesion to the body of the conveyor belt so that it does not delaminate during the service life of the belt.

SUMMARY OF THE INVENTION

The present invention is based upon the discovery that millable polyurethane can be processed on conventional rubber processing equipment and built onto heavy duty conveyor belts as a carry cover layer to greatly improve the wear resistance of the belt. It is also based upon the discovery that a tie gum layer which is comprised of a blend of polyvinylchloride and nitrile rubber can be utilized to attain satisfactory adhesion between such a carry cover layer which is comprised of polyurethane and a reinforcement layer which includes steel cords which are embedded in polychloroprene. In any case the discovery of a way to incorporate a polyurethane layer onto the upper surface of a conveyor belt as its carry cover can be utilized in accordance with this invention in manufacturing conveyor belts for heavy duty applications, such as in mining of iron ore and copper ore, that have greatly enhanced resistance to surface damage. These belts accordingly offer a longer service life, reduce mine down-time, reduce costs, and improve overall mine productivity without having an adverse effect on worker health or safety, and without detrimentally impacting the environment.

The present invention more specifically discloses a conveyor belt which is comprised of a carry cover layer, a tie gum layer which is situated immediately below the carry cover layer, a reinforcement layer which includes steel cords which are embedded in polychloroprene and which is situated immediately below the tie gum layer, and a rubber layer which is situated immediately below the reinforcement layer, wherein the carry cover layer is comprised of a millable urethane rubber. The tie gum layer will typically be an alloy of polyvinylchloride and nitrile rubber to attain good adhesion between the carry cover layer and the reinforcement layer. The reinforcement layer is comprised of steel cords which are embedded polychloroprene.

The subject invention also reveals in another embodiment thereof a conveyor belt which is comprised of a carry cover layer, a reinforcement layer which includes a resorcinol-formaldehyde-latex coated fabric reinforcement which is situated immediately below the carry cover layer and a rubber layer which is situated immediately below the reinforcement layer, wherein the carry cover layer is comprised of a millable urethane rubber.

DETAILED DESCRIPTION OF THE INVENTION

Figure 1:
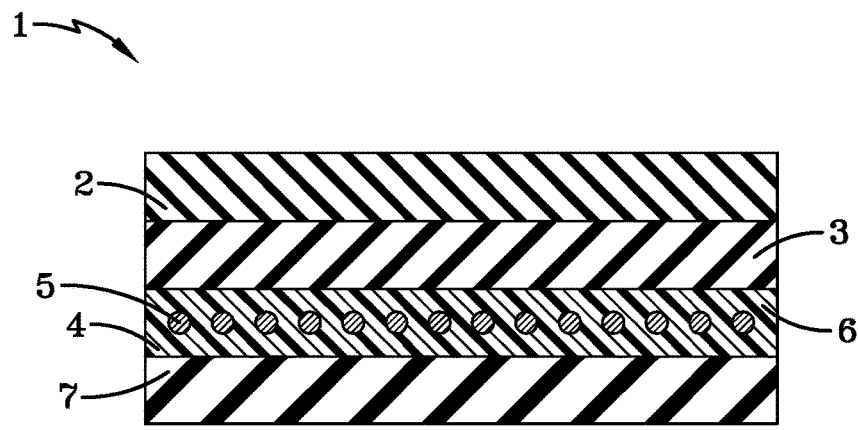
FIG. 1 is a cross-sectional view of one embodiment of the heavy duty conveyor belt of this invention having a reinforcement layer containing steel cords.

As illustrated in FIG. 1, in one embodiment of this invention the heavy duty conveyor belt 1 is reinforced with steel cords. In this embodiment of the invention the conveyor belt 1 includes a carry cover layer 2 which is comprised of a millable urethane rubber, a tie gum layer 3 which is situated immediately below the carry cover layer, wherein the tie gum layer is comprised of a blend of polyvinylchloride and nitrile rubber, a reinforcement layer 4 which includes steel cords 5 which are embedded in polychloroprene 6 and which is situated immediately below the tie gum layer 3, and a pulley cover layer 7 which is situated below the reinforcement layer 4 and which is comprised of a conventional rubbery polymer.

The carry cover layer 2 is typically from about 3/16 inch (5 mm) to 3/8 inch (10 mm) thick and is comprised of a millable polyurethane rubber which is typically a millable polyether polyurethane rubber. This millable polyurethane rubber is in the form of a solid before being cured and includes crosslink sites. The millable polyurethane rubber typically has a Mooney ML(1+4) viscosity at 100° C. which is within the range of 35 to 65 and which is more typically within the range of 40 to 60. The millable polyurethane rubber will also typically have a Shore A hardness which is within the range of 40 to 90 and which is more typically within the range of 50 to 80. In most cases the millable polyurethane rubber will have a Shore A hardness which is within the range of 55 to 75 with a Shore A hardness within the range of 60 to 70 being preferred. The millable polyurethane rubber will also normally have a resilience which is within the range of 40% to 60% and a specific gravity which is within the range of 1.03 to 1.05. MILLATHANE® millable polyurethane rubber from TSE Industries, Inc. of Clearwater, Fla. is suitable for use in the carry cover layer of the conveyor belts of this invention. The millable polyurethane rubber can be cured with conventional sulfur or peroxide curative systems with sulfur curing agents being preferred. It is typically advantageous to include zinc stearate in the curative package as an activator and processing aid.

The carry cover layer 2 will also preferably contain a reinforcing silica filler to attain optimal physical properties. The reinforcing silica filler will typically be present at a level which is within the range of 5 phr to 30 phr (parts per 100 parts by weight of rubber). The reinforcing silica filler will more typically be present in the carry cover layer at a level which is within the range of 10 phr to 20 phr A silane coupling agent will also be included at a level which is within the range of 1 phr to 5 phr.

The silica coupling agent will typically be a mercaptosilane, a blocked mercaptosilane, or an organosilicon compound of the general formula:

Z-Alk-S$_n$-Alk-Z  (I)

in which Z is selected from the group consisting of:

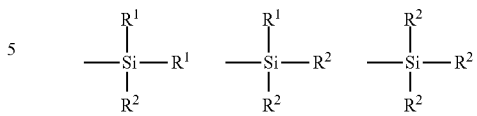

wherein $R^1$ is an alkyl group containing from 1 to 4 carbon atoms, a cyclohexyl group, or a phenyl group; wherein $R^2$ is an alkoxy group containing from 1 to 8 carbon atoms, or a cycloalkoxy group containing from 5 to 8 carbon atoms; wherein Alk is a divalent hydrocarbon of 1 to 18 carbon atoms and wherein n represents an integer from 2 to 8. The mercaptosilanes and blocked mercaptosilanes that can be used in the practice of this invention are described in International Patent Publication No. WO 2006/076670. The teachings of WO 2006/076670 are incorporated herein by reference for the purpose of describing specific mercaptosilanes and blocked mercaptosilanes that can be used in the practice of this invention. The teachings of WO 03091314 are also incorporated herein by reference for the purpose of describing specific silanes that can be utilized in the practice of this invention which emit low levels of volatile organic compounds or no volatile organic compounds.

Specific examples of sulfur containing organosilicon compounds which may be used as the silica coupling agent in accordance with the present invention include: 3,3'-bis (trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis (tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis (methyl ethoxypropoxysilylethyl) tetrasulfide, 3,3'-bis (diethyl methoxysilylpropyl) tetrasulfide, 3,3'-bis(ethyl di-sec.butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis(triethoxysilylpropyl) tetrasulfide. Therefore with respect to formula I, Z is preferably

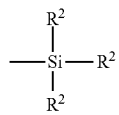

wherein $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the silica coupling agent that should be incorporated into the elastomeric compositions of this invention will vary depending on the level of the siliceous fillers that are included in the rubbery composition. Generally speaking, the amount of the silica coupling agent used will range from about 0.01 to about 5 parts by weight per part by weight of the siliceous fillers. Preferably, the amount of silica coupling agent utilized will range from about 0.02 to about 1 parts by weight per part by weight of the siliceous fillers. Preferably, the amount of silica coupling agent utilized will range from about 0.04 to about 0.4 parts by weight per part by weight of the siliceous fillers. More preferably the amount of the silica coupling agent included in the elastomeric compositions of this invention will range from about 0.05 to about 0.25 parts by weight per part by weight of the siliceous fillers.

The reinforcing silica filler that can be used in the carry cover layer of the conveyor belts of this invention can also typically be characterized by having a dibutylphthalate (DBP) absorption value in a range of about 100 to about 400, and more usually about 150 to about 300. The reinforcing silica filler typically has an average ultimate particle size which is within the range of 0.01 to 0.05 micron as determined using an electron microscope, although specific silica particles may be even smaller, and sometimes larger in size. Various commercially available reinforcing silica fillers may be used in the practice of this invention. Some representative examples of such silicas include those from PPG Industries that are sold under the Hi-Sil trademark with designations 210 and 243, silicas available from Rhone-Poulenc with the designations of Z1165MP and Z165GR, and silicas available from Degussa AG with the designations VN2 and VN3.

Carbon black will also typically be added to the polyurethane composition used in the carry cover layer to make it black in color and to dissipate static electricity that may build-up in the belt. The carbon black will typically be included in the polyurethane composition at a level which is within the range of 0.25 phr to about 4 phr. Carbon black will more typically be included at a level of 0.5 phr to 2 phr.

Virtually any type of commonly available, commercially-produced carbon black can be used in the practice of this invention. The carbon blacks utilized in the practice of this invention can be in pelletized form or an unpelletized flocculent mass. Preferably, for more uniform mixing, unpelletized carbon black is preferred. Carbon blacks having a surface area (EMSA) of at least 20 $m^2/g$ and more preferably at least 35 $m^2/g$ up to 200 $m^2/g$ or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following table.

| ASTM Designation (D-1765-82a) | Surface Area (D-3765) |
|---|---|
| N-110 | 126 $m^2/g$ |
| N-220 | 111 $m^2/g$ |
| N-330 | 83 $m^2/g$ |
| N-339 | 95 $m^2/g$ |
| N-550 | 42 $m^2/g$ |
| N-660 | 35 $m^2/g$ |

The carry cover layer 2 preferably further contains a silicone oil softener which is present at a level which is within the range of 1 phr to 10 phr. The silicon oil softener will more typically be present at a level which is within the range of 3 phr to 8 phr.

The tie gum layer 3 is comprised of a blend of polyvinylchloride and nitrile rubber. The tie gum layer of the conveyor belts of this invention will typically contain 40 phr to 90 phr of polyvinylchloride and 10 phr to 60 phr of nitrile rubber. The tie gum layer will more typically contain 45 phr to 80 phr of polyvinylchloride and 20 phr to 55 phr of nitrile rubber. It is normally preferred for the tie gum layer to be comprised of 48 phr to 60 phr of polyvinylchloride and 40 phr to 52 phr of nitrile rubber. The tie gum layer 3 will typically also contain from 5 phr to 30 phr of at least one reinforcing filler. The reinforcing filler will typically be carbon black, silica or a combination thereof which is present at a level which is within the range of 15 phr to 25 phr. For instance, the reinforcing filler can be a mixture of about 5 phr to about 15 phr carbon black and about 5 phr to about 15 phr of silica. The types of reinforcing silica and carbon black described with respect to the carry cover layer and also be used in the tie gum layer. In cases where a reinforcing silica is utilized in the tie gum layer it is important to further include a silica coupling agent in the tie gum layer formulation as described with respect to the polyurethane formulation used in the carry cover layer 2.

It is preferred for the tie gum layer to further contain a plasticizer at a level which is within the range of 4 phr to 20 phr. The plasticizer will more typically be present at a level which is within the range of 6 phr to 15 phr and will more typically be present at a level which is within the range of 8 phr to 12 phr. The plasticizer will normally be selected from phthalate plasticizers, halogenated paraffin plasticizers and phosphate plasticizers. The plasticizer will preferably be a phosphate plasticizer.

The reinforcement layer 4 is comprised of steel cords 5 which are embedded in polychloroprene 6. The reinforcement layer 4 is situated immediately below the tie gum layer 3 in a manner whereby the reinforcement layer 4 is in full contact with the tie gum layer 3. In other words, essentially the entire lower surface of the tie gum layer 3 is in direct contact with essentially the entire upper surface of the reinforcement layer 4. Standard steel cords 5 of the type which are conventionally used in reinforcing heavy duty conveyor belts can be used. The polychloroprene rubber used in the reinforcement layer is synthesized by the polymerization of 2-chlorobuta-1,3-diene ($CH_2$=CCl—$CHH_2$). Polychloroprene sold by E. I. du Pont de Nemours and Company as NEOPRENE® polychloroprene rubber.

A layer of conventional rubber is situated below the reinforcement layer as a pulley cover layer 7. The pulley cover layer 7 is typically about 1/16 inch (1.5 mm) to about 1/4 inch (6 mm) thick. The conventional rubber utilized in this layer can be comprised of styrene-butadiene rubber, natural rubber, synthetic polyisoprene rubber, polybutadiene rubber, polychloroprene rubber, nitrile butadiene rubber, and the like or a mixture thereof.

Figure 2:
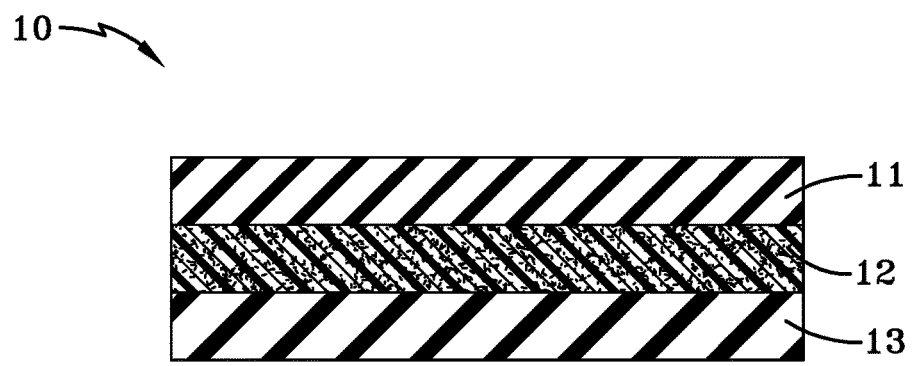
FIG. 2 is a cross-sectional view of a second embodiment of the heavy duty conveyor belt of this invention having a reinforcement layer containing fabric reinforcement.

In another embodiment of this invention as illustrated in FIG. 2 the heavy duty conveyor belt 10 includes a carry cover layer 11 which is comprised of a millable urethane rubber formulation as previously described, a reinforcement layer 12 which includes a resorcinol-formaldehyde-latex coated fabric reinforcement which is situated immediately below the carry cover layer 11 and pulley cover layer 13 which is situated below the reinforcement layer 12. In this embodiment of the subject invention the millable urethane rubber utilized in the carry cover layer 11 is of the same type of formulation as is used in the first embodiment of the invention as previously described.

The fabric utilized in the fabric reinforcement layer 12 can be comprised of virtually any fabric material having suitable physical properties. For instance the fabric can be a polyester fabric, a nylon fabric, or a polyester-nylon fabric. The fabric is coated with a conventional resorcinol-formaldehyde-latex (RFL) dip as is widely used throughout the tire and industrial rubber products industry for treating fabric reinforcements. U.S. Pat. No. 3,525,703 discloses a water-based adhesive composition for bonding synthetic fiber material to rubber which can be employed in the practice of this invention. The teachings of U.S. Pat. No. 3,525,703 specifically disclose the utilization of styrene-butadiene latex and vinylpyridine-styrene-butadiene latex in such water-based adhesive compositions. The teachings of U.S. Pat. No. 3,525,703 are incorporated herein by reference for the purpose of describing a suitable dip formulation.

A typical RFL dip formulation can contain about 250 to 30 parts by weight of water, 5 to 15 parts by weight of resorcinol, about 10 to 20 parts by weight of formaldehyde, about 0.1 to 0.5 parts by weight of sodium hydroxide, about 200 to 280 parts by weight of vinyl-pyridine latex, and about 8 to 16 parts by weight of ammonia. Such an RFL dip can be made by first preparing a resorcinol-formaldehyde solution by mixing the desired amount of sodium hydroxide (NaOH) into water and then adding the desired amounts of resorcinol and formaldehyde into basic water solution with constant stirring. Then, the RFL dip solution is made by adding the desired amount of the resorcinol-formaldehyde solution into the vinyl-pyridine latex with the solution being constantly stirred. Then, the desired amount of ammonia is added with mixing being continued until a homogeneous solution attained. The temperature will normally be maintained between about 70° F. (21° C.) to 80° F. (27° C.) during the entire mixing procedure. The RFL dip can then be used to coat the fabric material which will normally be a woven fabric using conventional procedures.

The pulley cover layer 13 is situated below the reinforcing layer 12 and is comprised of a conventional rubber as described with respect to the first embodiment of this invention. The conventional rubber will typically be styrene-butadiene rubber, natural rubber, synthetic polyisoprene rubber, polybutadiene rubber, polychloroprene rubber, or nitrile rubber (a copolymer of 1,3-butadiene and acrylonitrile).

This invention is illustrated by the following examples that are merely for the purpose of illustration and are not to be regarded as limiting the scope of the invention or the manner in which it can be practiced. Unless specifically indicated otherwise, parts and percentages are given by weight.

Examples 1-3

In this experiment a series of polyurethane rubber formulations for utilization in a conveyor belt carry cover layer were prepared. These rubber formulations had the compositions and physical properties depicted in Table 1.

TABLE 1

| | Example | | |
|---|---|---|---|
| | 1 | 2 | 3 |
| MILLTHANE ® E34 polyether millable urethane rubber* | 100.0 parts | 100.0 parts | 100.0 parts |
| Zinc Stearate | 0.5 parts | 0.5 parts | 0.5 parts |
| N330 Carbon Black | 30.0 parts | 25.0 parts | — |
| N220 Carbon Black | — | — | 25.0 parts |
| Dibutoxyethoxyethyl Adipate | 5.0 parts | 5.0 parts | 5.0 parts |
| Aliphatic Fatty Acid Ester | 1.0 parts | 1.0 parts | 1.0 parts |
| Sulfur | 1.5 parts | 1.5 parts | 1.5 parts |
| MBTS (Benzothiazyl Disulfide) | 4.0 parts | 4.0 parts | 4.0 parts |
| MBT (2-Mercaptobenzothiazole) | 2.0 parts | 2.0 parts | 2.0 parts |
| THANECURE ® ZM activator/accelerator for polyurethane rubber** | 1.0 parts | 1.0 parts | 1.0 parts |
| Tensile Strength | 3005 psi | 3722 psi | 4556 psi |
| Elongation | 433% | 448% | 464% |
| 100% Modulus | 581 | 485 | 505 |
| 300% Modulus | 2074 | 1864 | 2033 |
| Shore A Hardness | 77 | 69 | 69 |
| DIN Abrasion (rotating) | 45 | 42 | 36 |
| DIN Abrasion (non-rotating) | 44 | 45 | 41 |

*Mooney ML(1 + 4) viscosity @ 100° C. = 50 ± 10
**Partial complex of zinc chloride and MBTS Examples 4-5

In this experiment a further series of polyurethane rubber formulations for utilization in a conveyor belt carry cover layer were prepared. These rubber formulations had better abrasion resistance than those prepared in Examples 1-3. These formulations had the compositions and physical properties depicted in Table 2.

TABLE 2

| | Example | |
|---|---|---|
| | 4 | 5 |
| MILLTHANE ® E34 polyether millable urethane rubber* | 100.0 parts | 100.0 parts |
| ULTRASIL ® 7000 Silica | 20 parts | 15 parts |
| Si 266 Silica Coupling Agent (50% in carbon black) | 2.0 parts | 2.0 parts |
| Silicone Fluid (Akrochem DF55-1000)** | 5.0 | 5.0 |
| Sulfur | 2.0 parts | 2.0 parts |
| MBTS (Benzothiazyl Disulfide) | 4.0 parts | 4.0 parts |
| MBT (2-Mercaptobenzothiazole) | 2.0 parts | 2.0 parts |
| THANECURE ® ZM activator/accelerator for polyurethane rubber*** | 1.0 parts | 1.0 parts |
| Additional Compounding Agents | 2.0 parts | 2.0 parts |
| Tensile Strength | 3430 psi | 3568 psi |
| Elongation | 450% | 470% |
| 300% Modulus | 1564 | 1318 |
| Shore A Hardness | 62 | 60 |
| DIN Abrasion (rotating) | 32 | 23 |

*Mooney ML(1 + 4) viscosity @ 100° C. = 50 ± 10
**Viscosity = 1000 centistokes (25° C.)
***Partial complex of zinc chloride and MBTS While certain representative embodiments and details have been shown for the purpose of illustrating the subject invention, it will be apparent to those skilled in this art that various changes and modifications can be made therein without departing from the scope of the subject invention.

What is claimed is:

1. A conveyor belt which is comprised of a carry cover layer, a tie gum layer which is situated immediately below the carry cover layer, a reinforcement layer which includes steel cords which are embedded in polychloroprene and which is situated immediately below the tie gum layer, and a pulley cover layer which is situated immediately below the reinforcement layer, wherein the tie gum layer is an alloy which is comprised of 40 phr to 90 phr of polyvinylchloride and 10 phr to 60 phr of nitrile rubber, wherein the pulley cover layer is comprised of a rubbery polymer, wherein the carry cover layer is comprised of a millable urethane rubber, wherein the millable urethane rubber is a polyether polyurethane rubber, and wherein the millable urethane rubber includes crosslinking sites.

2. The conveyor belt as specified in claim 1 wherein the tie gum layer is comprised of 48 phr to 60 phr of polyvinylchloride and 40 phr to 52 phr of nitrile rubber.

3. The conveyor belt as specified in claim 2 wherein the tie gum layer is further comprised of 5 phr to 30 phr of at least one reinforcing filler selected from the group consisting of carbon black and silica.

4. The conveyor belt as specified in claim 3 wherein the reinforcing filler is comprised of about 5 phr to about 15 phr carbon black and about 5 phr to about 15 phr of silica.

5. The conveyor belt as specified in claim 1 wherein the millable urethane rubber has a Mooney ML (1+4) viscosity which is within the range of 35 to 65 and a Shore A hardness which is within the range of 40 to 90.

6. The conveyor belt as specified in claim 5 wherein the millable urethane rubber has a Mooney ML (1+4) viscosity which is within the range of 40 to 60 and a Shore A hardness which is within the range of 55 to 75.

7. The conveyor belt as specified in claim 5 wherein the millable urethane rubber has a resilience which is within the range of 40% to 60%.

8. The conveyor belt as specified in claim 5 wherein the millable urethane rubber has a specific gravity which is within the range of 1.03 to 1.05.

9. The conveyor belt as specified in claim 1 wherein the carry cover layer is further comprised of a reinforcing silica filler which is present in the carry cover layer at a level which is within the range of 5 phr to 30 phr.

10. The conveyor belt as specified in claim 9 wherein the reinforcing silica filler is present in the carry cover layer at a level which is within the range of 10 phr to 20 phr.

11. The conveyor belt as specified in claim 10 wherein the carry cover layer is further comprised of 1 phr to 5 phr of a silane coupling agent.

12. The conveyor belt as specified in claim 11 wherein the carry cover layer is further comprised of a silicone oil softener which is present at a level which is within the range of 1 phr to 10 phr.

13. The conveyor belt as specified in claim 12 wherein the silicone oil softener is present at a level which is within the range of 3 phr to 8 phr.

14. The conveyor belt as specified in claim 1 wherein the rubber layer is comprised of a member selected from the group consisting of styrene-butadiene rubber, natural rubber, synthetic polyisoprene rubber, polybutadiene rubber, polychloroprene rubber, and nitrile butadiene rubber.

15. The conveyor belt as specified in claim 1 wherein the tie gum layer is further comprised of 4 phr to 20 phr of a plasticizer.

16. The conveyor belt as specified in claim 15 wherein the plasticizer is selected from the group consisting of phthalate plasticizers, halogenated paraffin plasticizers and phosphate plasticizers.

17. The conveyor belt as specified in claim 15 wherein the plasticizer is a phosphate plasticizer.

18. The conveyor belt as specified in claim 1 wherein the tie gum layer is further comprised of 6 phr to 15 phr of a plasticizer.

19. The conveyor belt as specified in claim 18 wherein the plasticizer is a phosphate plasticizer.

\* \* \* \* \*